Patented June 30, 1942

2,288,370

UNITED STATES PATENT OFFICE 2,288,370

PURIFICATION AND RECONCENTRATION OF SPENT SULPHURIC ACID

Chester L. Read, Westfield, N. J., assignor to Standard Oil Development Company, a corporation of Delaware No Drawing. Application September 8, 1939, Serial No. 293,924

3 Claims. (Cl. 23—172)

This invention relates to the purification and reconcentration of spent sulphuric acid and particularly to the purification and reconcentration of sulphuric acid that has been used as a catalyst in condensation of saturated branched chain hydrocarbons and olefins.

Sulphuric acid used as a catalyst in such condensations of petroleum hydrocarbons becomes contaminated with dissolved carbonaceous material and diluted with water present in the feed stocks and obtained from certain side reactions whereby the catalytic activity of the acid is decreased rapidly with increased contamination.

It is an object of this invention to purify and reconcentrate spent sulphuric acid catalysts. This and other objects of the invention will be understood on reading the following description of the process.

In the condensation of iso-paraffins with olefins using sulphuric acid as a catalyst, acid of approximately 90 to 100% concentration is most effective. This acid acts solely as a catalyst in the condensation reaction. Consequently, there is no loss of acid in the reaction itself. However, certain side reactions take place in which some of the acid reacts with some of the hydrocarbons. The products of these side reactions, usually sulphonic acids, esters, or other sulphur containing carbonaceous compounds, are soluble in the sulphuric acid catalyst and the catalytic activity of the acid decreases as the amount of the dissolved carbonaceous material increases. Consequently, when the quantity of this dissolved carbonaceous material amounts to approximately 10% or more of the total acid phase, the catalyst activity is reduced to such an extent that it must be replaced with concentrated sulphuric acid. Water present in the feed stocks or produced in the side reactions tends to dilute the acid phase and also reduce the catalytic activity. The spent sulphuric acid catalyst is then freed of the dissolved carbonaceous material and restored to its initial activity by the following procedures.

The spent sulphuric acid catalyst is mixed with sufficient water to reduce the concentration of the acid phase to approximately 50%, the resulting mixture settled for ½ to 2 hours at a temperature of 225° to 250° F. Under these conditions the acid phase obtained in the operation contains a minimum ratio of dissolved carbonaceous material to sulphuric acid. If the acid phase is more or less concentrated than this value or if the settling is carried out at a lower temperature, the ratio of dissolved carbon to sulphuric acid content is greater than would be obtained under the optimum conditions specified. Pressures of 5 to 20 pounds per square inch may be used. If separation takes place at temperatures above 250° F., the tar phase reacts with the acid phase, the carbonaceous material being oxidized at the expense of the weak acid and the sulphuric acid being reduced to sulphur dioxide. If the resulting weak acid phase contains approximately 1% or less of carbon, based on the sulphuric acid content, it may be satisfactorily concentrated to 85 to 95% strength by conventional methods of vacuum distillation or hot air blowing and refortified to higher concentrations with sulphur trioxide. When, however, the carbon content is higher than this value, the acid cannot be satisfactorily concentrated by these procedures, owing to the carbonization of the carbonaceous material. This carbonized material generally exists in a voluminous gel-like suspension and in some cases as a practically solid mass of carbon throughout the acid, thus rendering the concentrated sulphuric acid unsuitable for use.

When weak separated acids are higher than 1% carbon content they are processed by pressure distilling at temperatures of about 300° to 350° F. before the concentrating step to reduce the carbon content to approximately 1% or less. The pressure employed is that developed by heating the acid to the desired distilling temperature in a closed vessel and may vary from 25 to 75 pounds per square inch. In pressure distillation, 5 to 10% of oil and water are removed and a tar phase is formed in the distillation vessel. The carbon content of the acid is reduced by 50 to 75% by this treatment at elevated temperatures. The acid resulting from the pressure distillation which contains approximately 1% of carbon or less may then be satisfactorily concentrated.

The acids obtained by concentrating the separated acids of approximately 1% carbon or lower or from concentrating the pressure distilled acids may be fortified to any desired concentration by the addition of sulphur trioxide. The resulting products, while containing some finely-divided carbon, are nevertheless as effective as fresh acid of the same concentration for use as a catalyst in the condensation of olefins and iso-paraffins.

Some of the steps followed in the procedures described above are somewhat similar to those employed in processing sludges derived from acid treating of naphtha or lube oils. However, there are several points in which distinct differences occur. The lowest carbon-acid relationship in separated spent alkylation acid is obtained when the weak acid is of approximately 50% concentration, whereas with naphtha or lube oil sludges, the carbon-acidity relationship decreases with decreased concentration of the weak acid. Separated acids from naphtha or lube oils which contain as high as 5% of carbon (based on the acid content) may be satisfactorily concentrated by the conventional methods, the carbonized material in the acid being in a finely-dispersed form which does not interfere with the use of the acid for further treating. Separated dilute sulphuric acids obtained from spent catalytic sulphuric acids that had been used in the condensation of olefins and paraffins, however, cannot be satisfactorily concentrated for further use if the carbon content is higher than approximately 1%.

The spent acid catalyst may be used in the refining of other petroleum oils such as naphthas, heating oils, lubricating oils, etc., and the sludge produced by such operation may be recovered by the usual acid recovery methods.

I claim:

1. In the purification and reconcentration of spent sulphuric acid that had been used as a catalyst in the condensation of olefins and paraffins, the steps which comprise adding sufficient water to such spent sulphuric acid to dilute said acid so that the aqueous acid phase that is later separated out is of a concentration of 50% sulphuric acid, settling at 200° to 250° F., separating an aqueous acid phase, distilling the said aqueous acid phase containing more than 1% of carbon at a super-atmospheric pressure of 25 to 75 pounds per square inch and at a temperature of about 300° to 350° F., separating the volatile fractions, concentrating the said residual layer by blowing with hot air and fortifying with sulphur trioxide.

2. In the purification and reconcentration of spent sulphuric acid that had been used as a catalyst in the condensation of olefins and paraffins, the steps which comprise adding sufficient water to such spent sulphuric acid to dilute said acid so that the aqueous acid phase that is later separated out is of a concentration of 50% sulphuric acid, settling at 200° to 250° F., separating an aqueous acid phase containing more than 1% of carbon, distilling the said aqueous acid phase at a super-atmospheric pressure and at a temperature of about 300° to 350° F., separating the volatile fractions, concentrating the said residual layer containing not over approximately 1% of carbon by blowing with hot air and fortifying with sulphur trioxide.

3. In the purification and reconcentration of spent sulphuric acid that had been used as a catalyst in the condensation of olefins and paraffins, the steps which comprise adding sufficient water to such spent sulphuric acid to dilute said acid so that the aqueous acid phase that is later separated out is of a concentration of 50% sulphuric acid, settling at 200° to 250° F., separating an aqueous acid phase containing more than 1% of carbon, distilling the said aqueous acid phase at a super-atmospheric pressure of 25 to 75 pounds per square inch and at a temperature of about 300° to 350° F., to reduce the carbon content 50 to 75% separating the volatile fractions, concentrating the said residual layer by blowing with hot air and fortifying with sulphur trioxide.

CHESTER L. READ.